(12) United States Patent
Wallrabenstein

(10) Patent No.: US 10,521,616 B2
(45) Date of Patent: Dec. 31, 2019

(54) REMOTE RE-ENROLLMENT OF PHYSICAL UNCLONABLE FUNCTIONS

(71) Applicant: Analog Devices, Inc., Norwood, MA (US)

(72) Inventor: John Ross Wallrabenstein, West Lafayette, IN (US)

(73) Assignee: Analog Devices, Inc., Norwood, MA (US)

( * ) Notice: Subject to any disclaimer, the term of this patent is extended or adjusted under 35 U.S.C. 154(b) by 192 days.

(21) Appl. No.: 15/807,255

(22) Filed: Nov. 8, 2017

(65) Prior Publication Data

US 2019/0138753 A1 May 9, 2019

(51) Int. Cl.
*G06F 21/00* (2013.01)
*G06F 21/73* (2013.01)
(Continued)

(52) U.S. Cl.
CPC ............. *G06F 21/73* (2013.01); *G09C 1/00* (2013.01); *H04L 9/002* (2013.01); *H04L 9/0866* (2013.01);
(Continued)

(58) Field of Classification Search
CPC ..... G06F 21/73; H04L 9/0894; H04L 9/3278; H04L 9/0866; H04L 9/002; H04L 2209/80; H04L 2209/805; G09C 1/00
See application file for complete search history.

(56) References Cited

U.S. PATENT DOCUMENTS

| 8,694,778 B2 | 4/2014 | Teuwen et al. |
| 8,694,856 B2 | 4/2014 | Tuyls et al. |

(Continued)

FOREIGN PATENT DOCUMENTS

| EP | 2 214 117 B1 | 2/2012 |
| WO | WO 2007/063473 A1 | 6/2007 |

(Continued)

OTHER PUBLICATIONS

Eiroa et al., Using Physical Unclonable Functions for Hardware Authentication: A Survey, 2010, 6 Pages (Year: 2010).*
(Continued)

*Primary Examiner* — Christopher C Harris
(74) *Attorney, Agent, or Firm* — Wolf, Greenfield & Sacks, P.C.

(57) ABSTRACT

As a PUF device ages, the response characteristics of the device change. Thus, mappings made on the original PUF outputs can drift and become invalid. Re-enrollment or re-mapping of hidden values to PUF response characteristics can resolve the changing nature of the PUF. Unfortunately, an adversary may tamper with the PUF during re-enrollment compromising security of the PUF. Accordingly, techniques of securely and remotely re-enrolling a PUF device are described. During an initial enrollment of the PUF device, multiple sets of enrollment values of the PUF device can be generated. For remote re-enrollment, a first initial set of enrollment values can be used to authenticate the PUF device. Upon authentication using the first initial set, the PUF device can re-enroll the PUF device and account for changes in PUF characteristics. A second set of initial enrollment values can then be used to verify that the PUF device is unaltered.

20 Claims, 8 Drawing Sheets

(51) Int. Cl.
   *H04L 9/00*       (2006.01)
   *H04L 9/08*       (2006.01)
   *G09C 1/00*       (2006.01)
   *H04L 9/32*       (2006.01)

(52) U.S. Cl.
   CPC .......... *H04L 9/0894* (2013.01); *H04L 9/3278* (2013.01); *H04L 2209/80* (2013.01); *H04L 2209/805* (2013.01)

(56) References Cited

U.S. PATENT DOCUMENTS

| | | | |
|---|---|---|---|
| 8,756,438 | B2 | 6/2014 | Devadas et al. |
| 8,782,396 | B2 | 7/2014 | Ziola et al. |
| 8,848,477 | B2 | 9/2014 | Schrijen et al. |
| 8,868,923 | B1 | 10/2014 | Hamlet et al. |
| 8,918,647 | B1 * | 12/2014 | Wallrabenstein ... H04L 63/0853 713/172 |
| 9,489,504 | B2 | 11/2016 | Yang et al. |
| 2011/0215829 | A1 | 9/2011 | Guajardo Merchan et al. |
| 2014/0189890 | A1 | 7/2014 | Koeberl et al. |
| 2016/0156476 | A1 | 6/2016 | Lee et al. |
| 2017/0164191 | A1 | 6/2017 | Orcutt |
| 2017/0346800 | A1 | 11/2017 | Katoh |
| 2018/0004444 | A1 * | 1/2018 | Murray ................. G06F 3/0622 |

FOREIGN PATENT DOCUMENTS

| | | |
|---|---|---|
| WO | WO 2007/116368 A1 | 10/2007 |
| WO | WO 2011/048126 A1 | 4/2011 |
| WO | WO 2011/089143 A1 | 7/2011 |
| WO | WO 2012/123400 A1 | 9/2012 |
| WO | WO 2015/002271 A1 | 1/2015 |
| WO | WO 2015/148659 A1 | 10/2015 |
| WO | WO 2016/058793 A1 | 4/2016 |
| WO | WO 2016/102164 A1 | 6/2016 |

OTHER PUBLICATIONS

Sutar et al., D-PUF: An Intrinsically Reconfigurable DRAM PUF for Device Authentication in Embedded Systems, ACM, Oct. 2016, 10 Pages (Year: 2016).*

Maiti et al., A Robust Physical Unclonable Function With Enhanced Challenge-Response Set, IEEE, Feb. 2012, 13 Pages (Year: 2012).*

Brussenskiy et al., Robust PUF Circuit Design against Temperature Variations and Aging Effect. Int'l Conf. Security and Management. 2015;pp. 211-216.

* cited by examiner

REMOTE RE-ENROLLMENT OF PHYSICAL UNCLONABLE FUNCTIONS

FIELD OF THE DISCLOSURE

The present application relates to physically unclonable function ("PUF") based authentication systems and methods.

BACKGROUND

A PUF can comprise a device or circuitry that generates an output dependent on unique physical properties of the PUF. For example, variations in manufacturing process and parts produce a chip comprising electrical circuits with unique hardware characteristics as even the smallest variation (e.g., below manufacturer specification) provides uniqueness.

SUMMARY OF THE DISCLOSURE

As a physically unclonable function (PUF) device ages, the response characteristics of the device change. Thus, mappings made on the original PUF response outputs can drift and ultimately become invalid. According to one aspect, re-enrollment or re-mapping of hidden values to PUF response characteristics can resolve the changing nature of the PUF. It is realized, however, that an adversary may tamper with the PUF before or during re-enrollment, and compromise security of the PUF. Accordingly, techniques of securely and remotely re-enrolling a PUF device are described. During an initial enrollment of the PUF device, multiple sets of enrollment values of the PUF device can be generated. For remote re-enrollment, a first initial set of enrollment values can be used to authenticate the PUF device. Upon authentication using the first initial set, the PUF device can re-enroll the PUF device and account for changes in PUF characteristics. A second set of initial enrollment values can then be used to verify that the PUF device is unaltered.

According to one aspect of the present application, an authentication device is provided. The authentication device can be configured to comprise: a physically unclonable function (PUF) device configured to generate an output value characteristic to the PUF device; and a processor connected to the PUF device, the processor configured to: generate a first set of initial enrollment values and a second set of initial enrollment values; execute a re-enrollment command on the PUF device, wherein the processor is further configured to: authenticate the PUF device using the first set of initial enrollment values; generate at least one new set of enrollment values using the PUF device; and determine whether the PUF device is in an unaltered state subsequent to generation of the at least one new set of enrollment values.

According to one embodiment, the processor is further configured to authenticate the PUF device with the second set of initial enrollment values to determine whether the PUF device is in the unaltered state. According to one embodiment, the processor is configured to: issue a first challenge to the PUF device to generate a first output, the first challenge from the first set of initial enrollment values; and recover a first key or secret or a first share using the first output.

According to one embodiment, the processor is configured to communicate the at least one new set of enrollment values to a verifying device. According to one embodiment, the processor is configured to reject the at least one new set of enrollment values responsive to a determination that the PUF device is not in an unaltered state subsequent to generation of the at least one new set of enrollment values. According to one embodiment, the processor is configured to use the at least one new set of enrollment values for subsequent authentication responsive to a determination that the PUF device is in an unaltered state subsequent to generation of the at least one new set of enrollment values.

According to one embodiment, the processor is configured to: communicate a challenge value to the PUF device to generate an output; map the output to a new value, the new value representing new key or secret or a new share; and include the challenge value and the new value in the at least one new set of enrollment values. According to one embodiment, the processor is configured to: generate, using the output and the new value, a helper value; and include the helper value in the at least one new set of enrollment values.

According to one embodiment, the processor is configured to: recover a first key, the first key associated with the first set of initial enrollment values; and encrypt, using the recovered first key, at least a portion of the at least one new set of enrollment values.

According to one embodiment, generating the at least one new set of enrollment values comprises: generating at least one tuple including a challenge value, a helper value, and an encryption of a key or secret. According to one embodiment, generating the at least one new set of enrollment values comprises generating a plurality of shares of a new key. Validating the at least one new set of enrollment values comprises: recovering a first share and a second share of a key, the first share and the second share respectively associated with the first and second sets of initial enrollment values; and authenticating the PUF device using the recovered first and second shares.

According to one aspect, a computer-implemented method of authenticating a device is provided. The method comprises: generating, by a processor, a first set of initial enrollment values and a second set of initial enrollment values, each of the first and second sets of initial enrollment values mapping a PUF output to a key or secret or share of a key or secret; executing a re-enrollment command on a PUF device, wherein the act of executing the re-enrollment command includes: authenticating the PUF device using the first set of initial enrollment values; generating at least one new set of enrollment values using the PUF device; and determining whether the PUF device is in an unaltered state subsequent to generation of the at least one new set of enrollment values.

According to one embodiment, the act of determining whether the PUF device is in an unaltered state subsequent to generation of the at least one new set of enrollment values includes: authenticating the PUF device with the second set of initial enrollment values. According to one embodiment, the act of authenticating the PUF device using the first set of initial enrollment values includes: issuing a first challenge to the PUF device to generate a first output, the first challenge from the first set of initial enrollment values; and recovering a first key or secret or first share using the first output.

According to one embodiment, the method further comprises communicating the at least one new set of enrollment values to a verifying device. According to one embodiment, the method further comprises rejecting the at least one new set of enrollment values responsive to determining that the PUF device is not in an unaltered state subsequent to generation of the at least one new set of enrollment values. According to one embodiment, the method further comprises using the at least one new set of enrollment values for subsequent authentication responsive to determining that the PUF device is in an unaltered state subsequent to generation of the at least one new set of enrollment values.

According to one embodiment, the act of generating the at least one new set of enrollment values comprises: communicating a challenge value to the PUF device to generate an output; mapping the output to a new value, the new value representing a new key or secret or a new share; and including the challenge value and the new value in the at least one new set of enrollment values.

According to one aspect, a non-transitory computer readable medium storing processor-executable instructions is provided. The processor-executable, when executed, perform a method comprising: generating a first set of initial enrollment values and a second set of initial enrollment values, each of the first and second sets of initial enrollment values mapping a PUF output to a key or secret or share of a key or secret; executing a re-enrollment command on a PUF device, wherein the act of executing the re-enrollment command includes: authenticating the PUF device using the first set of initial enrollment values; generating at least one new set of enrollment values using the PUF device; and determining whether the PUF device is in an unaltered state subsequent to generation of the at least one new set of enrollment values.

BRIEF DESCRIPTION OF THE DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Figure 1:
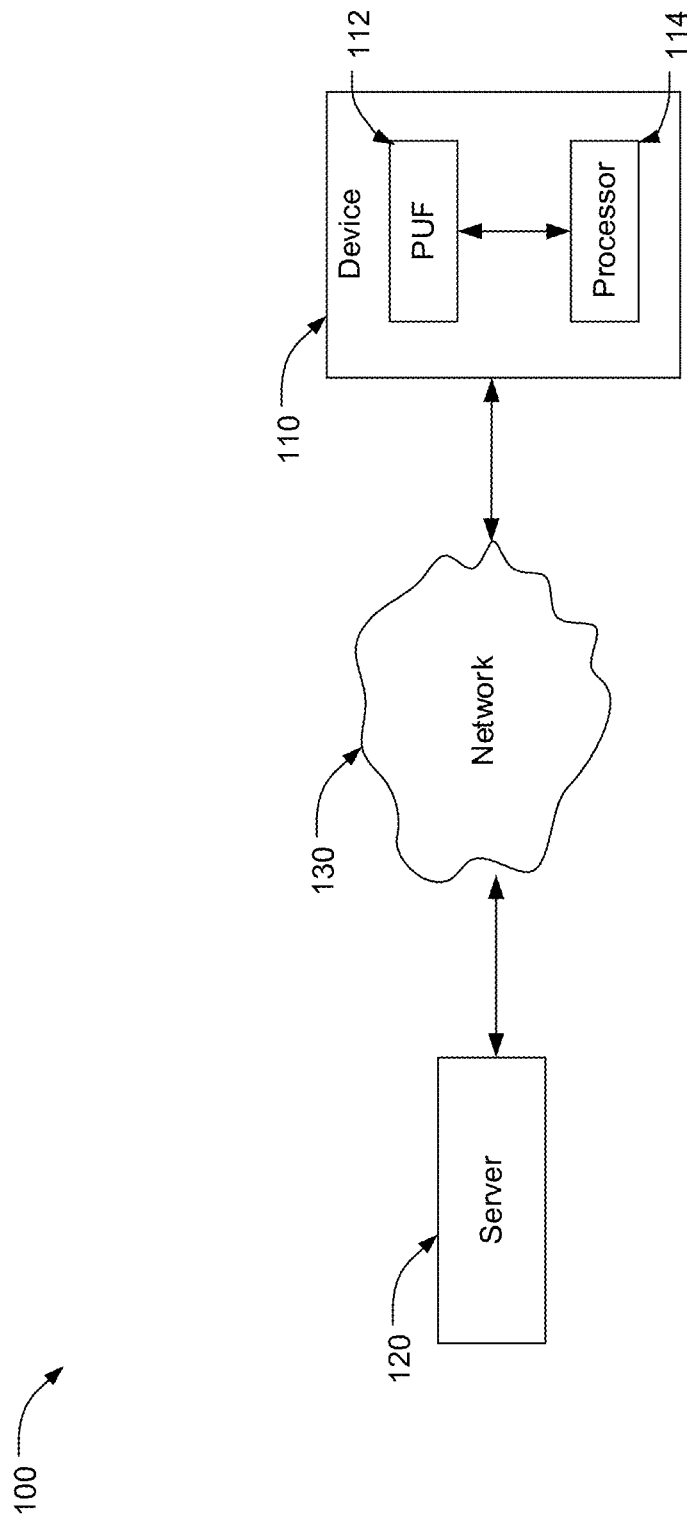
FIG. 1 is a system block diagram of an environment in which interactions may take place, according some embodiments.

Applicant has appreciated that re-enrollment of a physically unclonable function (PUF) device can be performed securely and remotely by enrolling the PUF device with multiple commitments. In some examples, a first enrollment of a device can occur in a secure setting (e.g., a manufacturing facility), allowing a producer or distributor some assurance in the security of the first set of enrollment values. To provide such assurance various embodiments of the system can initially enroll the PUF device with two sets of initial enrollment values. A set of enrollment values can comprise a collection of one or more values generated during an enrollment or re-enrollment process for subsequent authentication of the PUF device. In some embodiments, a set of enrollment values can include a challenge and a helper value for use by the PUF device to recover a key or secret or a share of a key or secret.

The key, secret, or share can be secured by mapping PUF values to the key, secret, or share based on selectively capturing unique values from the PUF, for example, by selective readings from the PUF or by providing challenges to the PUF to regenerate the key, secret, or share during authentication. Secure, remote re-enrollment allows PUFs already in use to be re-mapped to their secrets or shares with assurance that they have not been compromised. For example, secure re-enrollment can be executed by (1) authenticating the PUF device using a first set of the initial enrollment values, (2) generating new sets of enrollment values, and (3) validating the PUF or new sets of enrollment values using a second set of initial enrollment values. In conventional systems, PUF device re-enrollment is limited by security and computational resources. Accordingly, systems and techniques described herein are provided for secure and computationally efficient remote PUF device re-enrollment.

One challenge present in PUF based authentication is that the output of a PUF can drift as the PUF device hardware ages. Conventional systems may require abandoning use of a PUF device after the PUF device has reached a particular age because the output of the PUF device has drifted beyond a limit that allows the PUF device to be authenticated. Other techniques require manually re-enrolling the PUF device in order to configure authentication based on a recent state of the hardware of the PUF device. For example, a person may physically access the PUF device and re-enroll the PUF or the PUF device may be physically brought into a secure manufacturing facility where the PUF device can be re-enrolled. Manual re-enrollment, however, requires time and resources that limit longevity and scale of PUF device use.

Some conventional systems may execute remote re-enrollment but, in doing so, compromise security of the PUF device. For example, when the PUF device generates new enrollment information, a verifying device cannot validate that the new enrollment information was not sent from a PUF device that has been tampered with during the re-enrollment process. Other conventional systems employ asymmetric cryptography to continuously re-enroll a device. Given limited computational and memory resources, however, many devices are unable to employ asymmetric cryptography to implement continuous re-enrollment techniques.

Accordingly, some aspects relate to systems and methods that enable secure and remote re-enrollment of PUF devices. Additionally, some embodiments provide systems and methods of re-enrollment that can be executed with limited requirements of computational and/or memory resources.

FIG. 1 illustrates an example environment 100 in which remote and secure re-enrollment of an authentication device can be executed, in accordance with some embodiments. In this example, environment 100 includes a device 110, a verifier 120, and a network 130. The device 110 can include a PUF 112 and a processor 114 in communication with the PUF 112. In some embodiments, the verifier 120 can comprise a separate server in communication with the device 110. In some embodiments, the device 110 may communicate with the verifier 120 over the network 130. The network 130 can comprise the Internet, a local area network (LAN), or any other network over which communications may take place as embodiments are not limited in this respect. Although the verifier 120 and the device 110 are shown separately in FIG. 1 the device 110 and the verifier 120 can be configured to comprise components of a single device or system in some embodiments. In one embodiment, the device 110 and verifier 120 can be configured as separate chips on the same circuit board. In another embodiment, the device 110 and verifier 120 can be configured as separate processes executed by a processor. For example, the device 110 can comprise a process that interacts with the PUF 112 and the verifier 120 can comprise a stage of a trusted boot process.

According to some embodiments, the PUF 112 can comprise circuitry that generates an output dependent on unique physical properties of the PUF 112. For example, variations in manufacturing process and parts may produce a chip comprising electrical circuits with unique hardware characteristics. The PUF 112 may comprise one or more electrical circuits on the chip that generate outputs based on the unique hardware characteristics specific to the one or more electrical circuits. Examples of other PUFs include optical PUFs, magnetic PUFs, and acoustic PUFs. In some embodiments, the PUF 112 can further be configured to generate outputs based on an input. For example, in response to receiving an input, the PUF 112 can be configured to generate an output based on unique hardware properties of the PUF 112 and the input.

According to some embodiments, the input may comprise a challenge. In some embodiments, the PUF 112 can be configured to generate an output without receiving an input. In one example, a PUF based on SRAM can provide PUF outputs based on the state of the memory bits. By requesting the state of the memory bits at a memory address or addresses a unique value can be obtained and used in encoding secret values, keys, shares, etc. In some embodiments, an output of the PUF 112 may be noisy and vary slightly across multiple evaluations of a constant input. In some embodiments, the device 110 can use a fuzzy extractor to generate a value using an output of the PUF 112 that is constant for a fixed input. In one example, fuzzy extraction can be implemented using error correction code (ECC) and a helper value to recover a constant value for a fixed input using a PUF. Algorithm 1 below illustrates an example algorithm to generate the helper value or string.

| Algorithm 1 Gen Algorithm |
|---|
| Input : A finite field $\mathbb{F}_n$ of order n; A challenge c<br>O ← PUF(c)<br>$V \in \mathbb{F}_n$<br>P ← O ⊕ ECC(V)<br>return ⟨V, P⟩ |

In Algorithm 1 above, the device 112 generates a response O of PUF 112 to a challenge c. Next, the device 112 generates a random k-bit value V that is to be reconstructed at a subsequent time in response to receiving the challenge c. Next, the device 112 can generate helper string P as the output of O xor ECC(V). ECC can, for example, comprise a binary (n, k, 2t+1) error correcting code of length n capable of correcting t errors. Algorithm 2 below illustrates an example of how the helper string P may be used to recover the value V using the PUF.

| Algorithm 2 Rep Algorithm |
|---|
| Input : A challenge c, Helper string P<br>O' ← PUF(c)<br>V ← D(P ⊕ O')<br>return V |

In Algorithm 2 above, the helper string (e.g., generated by executing Algorithm 1) is used to recover V when the PUF 112 receives challenge c. The PUF 112 first generates a response O' to challenge c. The response O' may be slightly different than the response O generated in Algorithm 1. The device 112 can then recover V using decoding scheme D corresponding to the correction code ECC used in Algorithm 1. In some embodiments, the value V can be recovered using the helper string P and the decoding scheme D when O' is within a distance t of O. In some embodiments, the distance t may comprise a number of differences between two strings of equal length.

Various examples of PUFs and systems and techniques that employ PUFs are described in more detail in U.S. Publication No. 2017/0063559 entitled "AUTHENTICATION SYSTEM AND DEVICE INCLUDING PHYSICAL UNCLONABLE FUNCTION AND THRESHOLD CRYPTOGRAPHY," incorporated by reference herein.

In some embodiments, the device 110 and the verifier 120 can be configured to interact in order to execute authentication and enrollment processes. For example, the device 110 may enroll with verifier 120 and subsequently execute authentication using enrollment information in order to gain access to a resource (e.g., an application, file, service). According to some embodiments, enrollment includes generating mappings between PUF outputs and a secret or key or shares of a secret or key. In some embodiments, the device 110 can further be configured to execute remote and secure re-enrollment, for example, to update secret or share mappings.

In some embodiments, the device 110 can execute an initial or original enrollment using PUF 112 to generate multiple (e.g., two) sets of initial enrollment values that can be used for subsequent authentication. According to some embodiments, the device 110 can execute the initial enrollment process with the verifier 120. An initial enrollment process can be executed in a secure location where a risk of tampering or other intrusion by an adversary is substantially low or not present. For example, the initial enrollment process can be executed in a manufacturing facility prior to deployment of the device 110. By executing the initial enrollment process in the secure location, the device 110 can safely communicate sensitive information such as generated key and/or secret information to the verifier 120.

In some embodiments, during the initial enrollment, the device 110 can receive multiple challenges from the verifier 120. For each of the challenges, the device 110 can employ the PUF 112 to generate a response. For example, the device 110 can issue a challenge to the PUF 112 and receive a corresponding response. Additionally, the device 110 can map each response to a key, secret or share.

In some embodiments, the device 110 can generate each of the multiple sets of enrollment values during initial enrollment as a challenge, a generated helper value, and a generated key, secret, or share. In one example, the device 110 can generate each set of enrollment values as a tuple that includes a challenge, a helper, and a key, secret, or share. The device 110 can send the multiple sets of enrollment values to the verifier 120 which can store the sets of enrollment values and use them for subsequent authentication of the device 110.

According to some embodiments, after initial enrollment of the device 110 (e.g., in a manufacturing facility) the device 110 can be deployed for use. While the device 110 is in operation, it can be authenticated using sets of enrollment values generated by the device 110. For example, the verifier 120 can verify an identity and security of the device 110 using the sets of enrollment values generated during initial enrollment. In some embodiments, the device 110 can request access to a resource or service. The verifier 120 can be configured to verify an identity of the device 110 and/or confirm that the device 110 has not been tampered with by authenticating the device 110 using one or more stored enrollment values.

According to some embodiments, after the device 110 has been deployed for a period of time the PUF 112 can age. For example, the hardware characteristics of the PUF 112 can change over time. Thus, mappings made on the original response outputs of the PUF 112 may not be valid. As a result, the verifier 120 may be unable to continue using initial sets of enrollment values in order to authenticate the device 110.

According to some embodiments, the device 110 can be configured to execute remote re-enrollment while the device 110 is deployed and/or in operation in order to remain authenticable. In some embodiments, the device 110 can be configured to execute remote re-enrollment on a regular basis in order to prevent aging that invalidates sets of enrollment values for authentication. In some embodiments, the device 110 can be commanded (e.g., by verifier 120) to execute remote re-enrollment.

In some embodiments, the device 110 can be configured to use two sets of initial enrollment values during re-enrollment. During remote re-enrollment, the verifier 120 can first authenticate the device 110 using a first set of initial enrollment values. In some embodiments, the verifier 120 can issue a first test using the first set of original enrollment values. The device 110 can then generate a response to the first test. If the verifier 120 determines that the response to the first test is valid, the verifier 120 can issue one or more new challenges to the device 110. The device 110 can use the one or more new challenges to generate new sets of enrollment values. For example, the device 110 can generate one or more new sets including a challenge, a helper value, and a key, secret, or share.

In some embodiments, the device 110 can encrypt all or a portion of the new sets of enrollment values using a key or secret recovered from the first set of initial enrollment values. For example, the device 110 can encrypt the one or more newly generated keys, secrets, or shares using the key or secret recovered from the first set of initial enrollment values. The device 110 can then send the new sets of enrollment values to the verifier 120. For example, the device 110 can send multiple sets, each including a challenge, a generated helper value, and encrypted key, secret, or share. By encrypting all or part of the new sets of enrollment values, the device 110 is able to communicate newly generated keys, secrets, or shares to the verifier 120 without exposing the actual values of the keys, secrets, or shares. Accordingly, an adversary would be unable to recover a newly generated key or secret even if it is able to intercept the communication.

In some embodiments, the verifier 120 can validate the received new sets of enrollment values. For example, the verifier 120 can verify that the device 110 was not tampered with prior to or during the remote re-enrollment process. By doing so, the verifier 120 can ensure that the new enrollment values were not generated or corrupted by a malicious entity. In some embodiments, the verifier 120 can utilize a second set of initial enrollment values to validate the received new sets of enrollment values. In some embodiments, the verifier 120 can issue a second test to the device 110 and authenticate the device. The verifier 120 can generate the second test using the second set of initial enrollment values. The device 110 generates a response to the second test. For example, the device 110 utilizes a second challenge and helper value from the second set of initial enrollment values received from the verifier 120 to recover a key, secret, or share. The device 110 can then generate a response using the recovered key, secret, or share.

According to some embodiments, the verifier 120 can determine, based on the response from the device 110, whether the remote re-enrollment was executed successfully. For example, the verifier 120 can ensure that the device 110 was not tampered with during the process of re-enrollment. In some embodiments, upon verifying that the second response is valid, the verifier 120 can accept the new sets of enrollment values. In some embodiments, the verifier 120 can be configured to utilize the new sets of enrollment values for subsequent authentication and re-enrollment processes.

Figure 2:
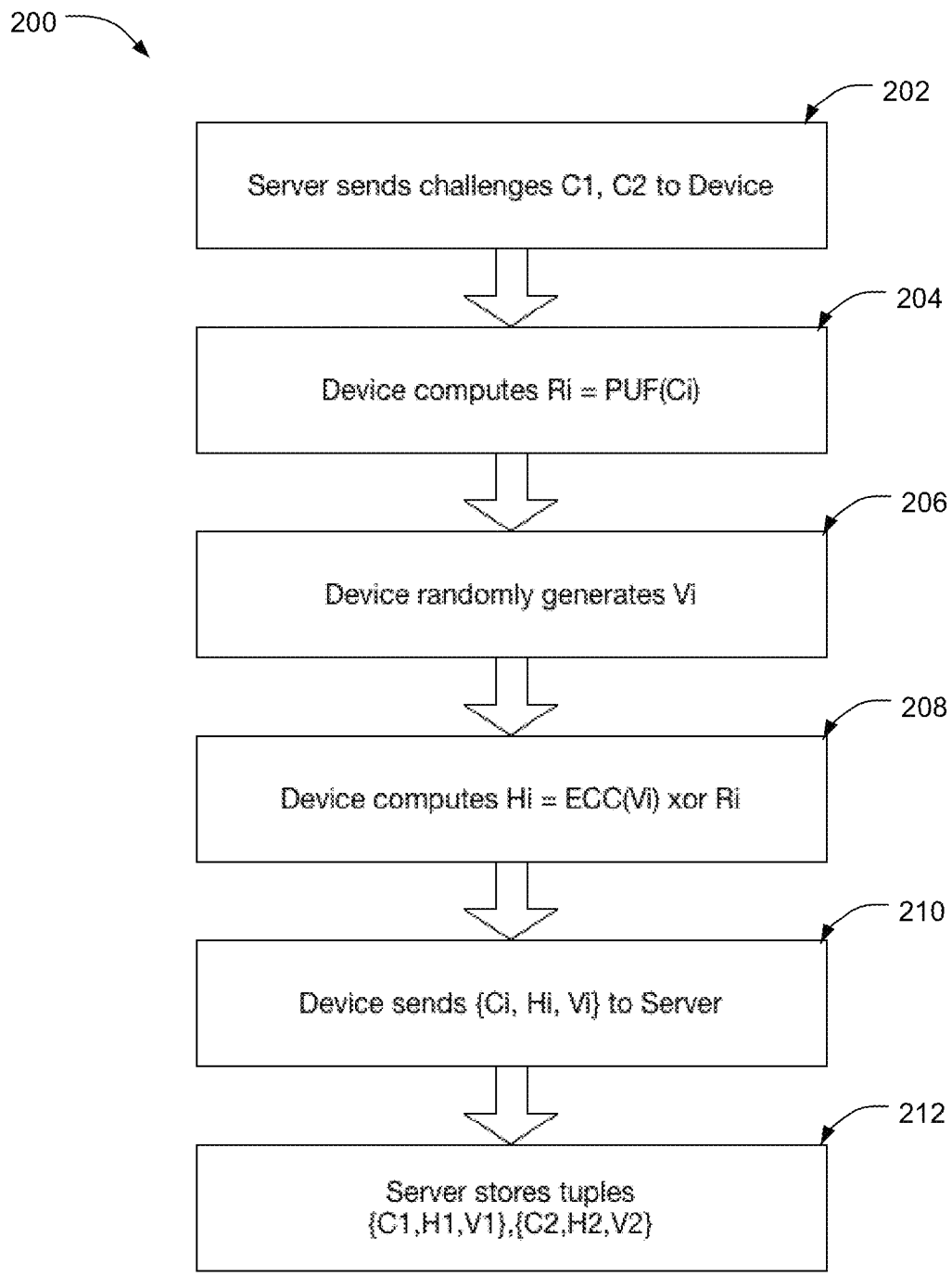
FIG. 2 illustrates an example process flow for enrolling a commitment of a PUF device, according to some embodiments.

FIG. 2 illustrates an example process of a device (e.g., device 110) enrolling with a server (e.g., verifier 120) according to some embodiments. As described above, the device and the server can be disparate systems or can be components of a single device. Process 200 can be executed during initial enrollment of the device (e.g., device 110), for example, in a secure location. For example, the initial enrollment can be performed in a trusted environment (e.g., a manufacturing facility) before deployment of the device.

According to one embodiment, process 200 begins at act 202 where the server sends multiple challenges to the device (e.g., device 110). In some embodiments, the server can be configured to send two challenges C1 and C2 to the device. In some embodiments, each of the challenges may comprise a random value. For example, a challenge can comprise a random string of bits. Next, process 200 proceeds to act 204 where the device uses a PUF (e.g., PUF 112) to generate values using the challenges. In some embodiments, the device can communicate each of the challenges as an input to the PUF. The PUF can be configured to generate responses corresponding to each of the challenges. For example, the PUF can generate responses R1 and R2 corresponding to the challenges C1 and C2.

Next, process 200 proceeds to act 206 where the device generates a key, secret, or share. In some embodiments, the device can be configured to generate the key, secret, or share as a value that is to be recovered using the PUF during authentication and that remains constant for a constant input (e.g., for a given challenge). For example, the device can generate random values V1 and V2 and respectively map the values to R1 and R2 generated by the PUF. In one example, each of V1 and V2 can be generated as described in Algorithm 1 above. In some embodiments, a random value can comprise a random string of bits, a random number, or other type of random value. For example, the random value can comprise a random set of bits.

Next process 200 proceeds to act 208 where the device generates helper values. In some embodiments, the device generates helper values for generated key, secret or share V1 and V2. For example, the device can generate helper values H1 and H2 for V1 and V2. In some embodiments, the helper values can be generated by executing Algorithm 1 described above. For example, each helper value can be generated by: (1) executing ECC on generated values V1 and V2, and (2) executing an "exclusive or" operation between the result of each of the ECC operations on the values V1 and V2 and respective PUF responses R1 and R2 to generate helper values H1 and H2. In the example where the device receives two challenges (C1, C2), generates two PUF responses (R1, R2), and generates two keys, secrets, or shares (V1, V2), the device can generate two helper values (H1, H2) where each helper Hi=ECC(Vi) xor Ri.

Next process 200 proceeds to act 210 where the device generates sets of enrollment values and sends them to the server. In some embodiments, the device forms a set of enrollment values as a challenge, helper value, and generated key, secret, or share. For example, for the two received challenges (C1, C2) received by device, the device generates enrollment value sets {C1, H1, V1} and {C2, H2, V2}. At act 212, the server can store the sets of enrollment values.

In some embodiments, the server does not store the actual value of a key, secret, or share (e.g., V1 or V2). Instead, the server can be configured to store a resulting value of a function of the key, secret, or share (e.g., f(V1) and f(V2)) rather than the values (V1 and V2) themselves. In some embodiments, the server can be configured to store a one-way function of the key, secret, or share f(V) such that it is computationally infeasible to recover V given f(V). For example, f(.) may comprise a cryptographic hash function, or denote scalar multiplication of the public base point G of an elliptic curve by V. Thus, the server upon receipt of the tuple {C, H, V} stores the transformed tuple {C, H, f(V)}.

In some embodiments, to perform authentication, the server can transmit {C, H} to the device. The device can recover a key, secret, or share V' and send it to the server. The server can authenticate by checking if f(V')=f(V). Storing only f(V) provides protection against covert adversarial compromise of the confidentiality of the verifier's database. For example, in the case that an adversary accesses the server's memory. If the server were to store the value of V directly, the adversary would be able to read the key, secret, or share (V) stored in the database. As a consequence, the adversary would have the ability to masquerade as the device by using V during authentication. However, by instead storing a value of a computationally irreversible function of the key, secret, or share f(V), the server can prevent an adversary from accessing the actual key, secret, or share V. Thus the adversary would be unable to authenticate with the server.

In some embodiments, a server can receive shares Vi of a key or secret V from the device. For example, the value V can be split such that V can only be recovered through polynomial interpolation using the shares Vi. In some embodiments, a sharing scheme employing two shares V1 and V2 can be used. The sharing scheme may require both shares to recover the key or secret V. In some embodiments, the server can be configured to store challenge and helper values associated with each share and a value of a function of the key or secret. For example, the server can store {{C1, H1}, {C2, H2}, f(V)} where {C1, H1} and {C2, H2} are the challenge helper pairs corresponding respectively to shares V1 and V2. In some embodiments, the server, during authentication, issues the challenge helper pairs to the device. For example, the server can issue {C1, H1} and {C2, H2} to the device and receives shares V1' and V2' recovered by the device. The server can then generate V' using polynomial interpolation of the values V1' and V2', which can enable the server to compute f(V') and compare against a value f(V) stored during enrollment.

In some embodiments, the verifier 120 can be configured to authenticate the device 110 using one or more sets of stored enrollment values. For example, to authenticate the device 110, the verifier 120 can use one or more of the sets of enrollment values generated during device enrollment or re-enrollment (e.g., sets of enrollment values generated during process 200 and/or 400).

Figure 3:
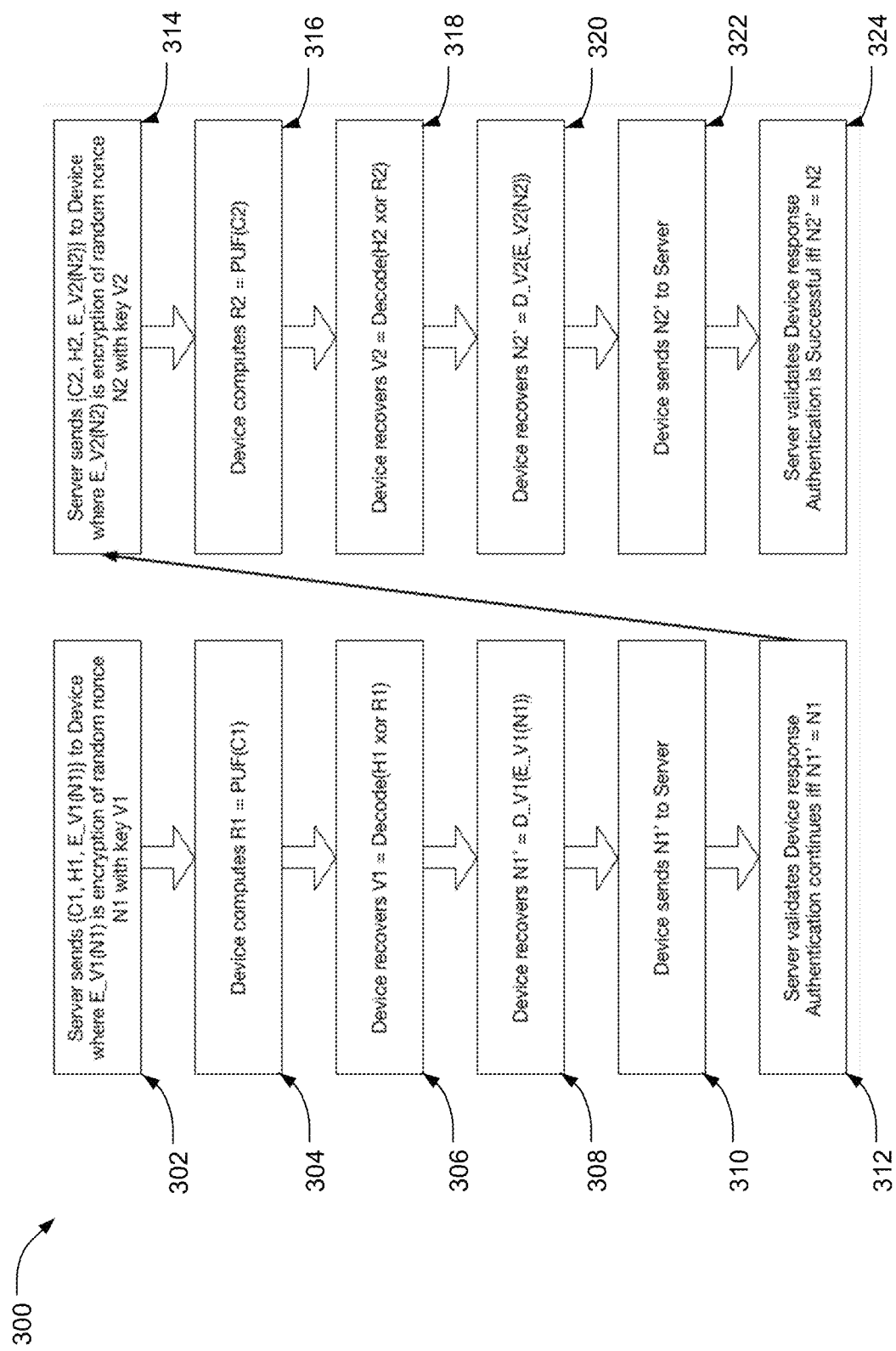
FIG. 3 illustrates an example process flow for authenticating a PUF device, according to some embodiments.

FIG. 3 illustrates an example process of a device (e.g., device 110 with PUF 112) authenticating with a server (e.g., verifier 120) according to some embodiments. Process 300 can, for example, be executed to authenticate device 110 after the device 110 has been initially enrolled (e.g., by process 200).

Process 300 begins at act 302 where the server sends a first challenge set to the device. In some embodiments, the server can generate the first challenge set using a first set of enrollment values (e.g., from process 200). In some embodiments, the challenge set can include a challenge value, a helper value, and a test value. The test value can comprise a value that must be processed by the device during authentication to generate a response. For example, the PUF device can be configured to execute a cryptographic operation using the test value to generate a response. Based on a response of the device, the server can verify an identity of the device. In some embodiments, the server can be configured to generate the test value by encrypting a random value (e.g., a nonce) with a key or secret. The key or secret can comprise a value generated during device enrollment (e.g., generated during process 200). For example, in process 300 the server generates the first challenge set including challenge C1, helper value H1, and encrypted value E_V1(N1) to the device where E_V1(N1) is an encryption of random nonce N1 with key or secret V1. The set {C1, H1, V1} can comprise an original set of enrollment values stored by the server during enrollment (e.g., during process 200).

Next, process 300 proceeds to act 304 where the device employs a PUF to generate an output. In some embodiments, the device can be configured to communicate the received challenge C1 to the PUF. The PUF then generates an output. For example, the PUF generates a response R1. In some embodiments, the PUF can generate an output based on the input value (e.g., challenge C1) in addition to unique hardware properties of the PUF. In other embodiments, the PUF can generate a response that is based on the unique hardware properties of the PUF and not the input value.

Next, process 300 proceeds to act 306 where the device recovers a value using the output generated by the PUF. In some embodiments, the device can employ a received helper value and decoding code to recover a key or secret (e.g., as described by Algorithm 2 above). In process 300, the device recovers a key or secret V1 by decoding a result of an "exclusive or" operation between the output R1 of the PUF and the received helper value H1.

Next, process 300 proceeds to act 308 where the device generates a response to be used for validation of the device. In some embodiments, the device can use the recovered key or secret to execute a cryptographic operation. The result of the cryptographic operation can be used to verify the identity of the device. For example, the device can use the recovered key or secret V1 to decrypt the received encryption E_V1 (N1) to recover a value N1'. Next, at act 310, the device sends a result of the cryptographic operation to the server. In some embodiments, the device can be configured to generate an authentication token using a result of the cryptographic operation and send the authentication token to the server. For example in process 300, the device sends recovered nonce N1' to the server.

Next, process 300 proceeds to act 312 where the server validates a response received from the device. In some embodiments, the server verifies an authentication token received from the device. For example, the server can be configured to determine whether the recovered nonce N1' matches with the nonce N1 generated by the server. In some embodiments, the server can be configured to continue the authentication process 300 responsive to determining a successful response to the first challenge set. For example, the authentication continues if recovered nonce N1' matches nonce N1. If, however, the server determines that the response from the device is not valid (e.g., N1' does not equal N1), the server can be configured to prevent the device from accessing a requested resource. For example, the server can reject a request to access a file or service. In another example, the server can be configured to generate an alert that the device has been tampered with. In some embodiments, the server can attempt to re-initiate authentication.

In some embodiments, the process 300 can end responsive to successful authentication of the first challenge set. The server can, for example, grant the device access to a requested resource responsive to determining a valid response to the first challenge set.

According to some embodiments, the process 300 can continue authentication responsive to determining that the device generated a valid response for the first challenge set. In some embodiments, the server can proceed to authenticate the device using a second set of enrollment values (e.g., generated during process 200). Process 300 proceeds to act 314 where the server generates a second challenge set using the second set of enrollment values. In some embodiments, the second challenge set can include a challenge value, a helper value, and a test value. In some embodiments, the server can be configured to generate the test value by encrypting a random nonce with a key or secret. The key or secret can comprise a key or secret generated during device enrollment. For example, in process 300 the server sends a set including challenge C2, helper value H2, and encrypted value E_V2(N2) to the device where E_V2(N2) is an encryption of random nonce N2 with key or secret V2.

Process 300 then proceeds the authentication process to act 316 where the device employs the PUF to generate an output. In some embodiments, the device can be configured to communicate the received challenge C2 to the PUF. The PUF then generates an output. For example, the PUF generates a response R2. In some embodiments, the PUF can generate an output based on the input value (e.g., based on challenge C2) in addition to unique hardware properties of the PUF.

Next, process 300 proceeds to act 318 where the device recovers a value using the output generated by the PUF. In some embodiments, the device can employ a received helper value H2 and decoding code to recover the value (e.g., as described by Algorithm 2 above). In process 300, the device recovers a key or secret V2 by decoding a result of an "exclusive or" operation between the output (R2) of the PUF and the received helper value (H2).

Next, process 300 proceeds to act 320 where the device generates a response to be used for validation of the device. In some embodiments, the device can use the recovered key or secret to execute a cryptographic operation. The result of the cryptographic operation can be used to verify the identity of the device. For example, the device can use the recovered key or secret (V2) to decrypt the received encryption E_V2 (N2) to recover a value N2'. Next, at act 322, the device sends a result of the cryptographic operation to the server. In some embodiments, the device can be configured to generate an authentication token using a result of the cryptographic operation and send the authentication token including the recovered value (N2') to the server. For example in process 300, the device sends the recovered nonce (N2') to the server.

Next, process 300 proceeds to act 322 where the server validates a response received from the device. In some embodiments, the server verifies an authentication token received from the device. For example, the server can be configured to determine whether the recovered nonce N2' matches with the nonce N2 generated by the server. If the server determines that the response from the device is not valid (e.g., N2' does not equal N2), the server can be configured to prevent the device from accessing a requested resource. For example, the server can reject a request to access a file or service. In another example, the server can be configured to generate an alert that the device has been tampered with. In some embodiments, the server can be configured to attempt to re-initiate authentication.

Figure 4:
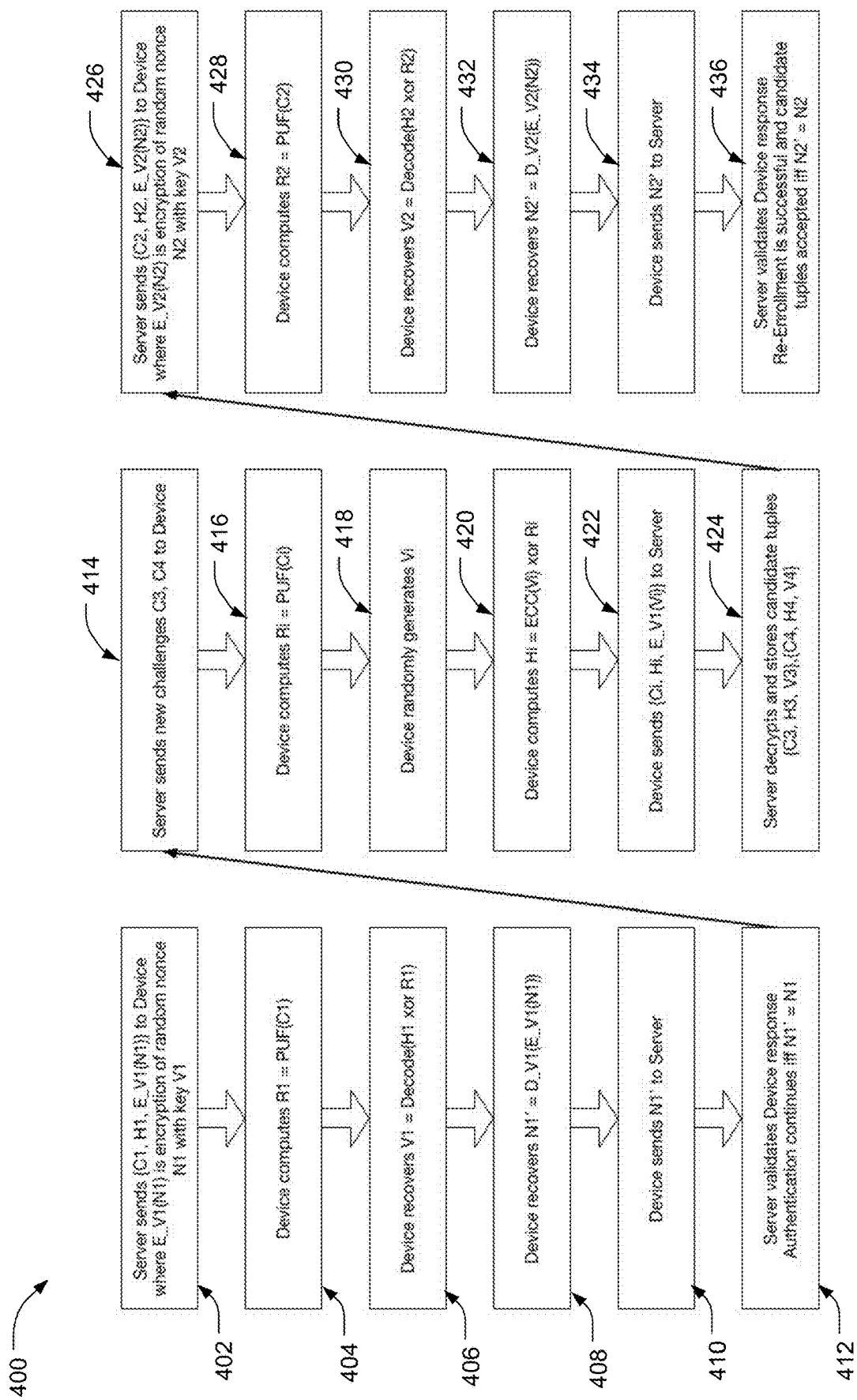
FIG. 4 illustrates an example process flow for re-enrolling a commitment of a PUF device, according to some embodiments.

FIG. 4 below illustrates a process 400 of re-enrollment, according to some embodiments. Example process 400 can be executed by a device including a PUF (e.g., device 110 with PUF 112) and a server (e.g., verifier 120). In some embodiments, the device can be configured to execute a re-enrollment command responsive to a command (e.g., from the verifier 120 or other entity). Additionally or alternatively, the device can be configured to execute a re-enrollment command at a set frequency (e.g., every month).

Process 400 begins at act 402 where the server sends a first challenge set to the device. In some embodiments, the server can be configured to generate the first challenge set using a first set of enrollment values. For example, the first challenge set can include a challenge value C1 and a helper value H1 that were stored during original enrollment of the device. The server can further generate a nonce value N1 and encrypt it using a key or secret V1 that was generated during original enrollment to generate an encryption E_V1(N1). The server can transmit the first challenge set {C1, H1, E_V1(N1)} to the device.

Next, process 400 proceeds to act 404 where the device uses a PUF (e.g., PUF 112) to generate a response value using the first challenge set. For example, the device can communicate the challenge C1 to the PUF. The PUF can generate a response R1. In some embodiments, the PUF can generate a response based on the challenge C1 in addition to the unique hardware properties of the PUF.

Next process 400 proceeds to act 406, where the device recovers a key or secret using the output generated by the PUF. In some embodiments, the device can employ a received helper value and decoding code to recover the value (e.g., as described by Algorithm 2 above). In process 300, the device recovers a key or secret V1 by decoding a result of an "exclusive or" operation between the output R1 of the PUF and the received helper value H1.

Next, process 400 proceeds to act 408 where the device generates a value to be used by the server for validation of the device. In some embodiments, the device can use the recovered value V1 to execute a cryptographic operation. For example, the device can use the recovered key or secret V1 to decrypt the received encryption E_V1(N1) to recover a value N1'. Next, at act 410, the device sends a result of the cryptographic operation to the server. In some embodiments, the device can be configured to generate an authentication token including a result of the cryptographic operation and to send the authentication token to the server.

Next, process 400 proceeds to act 412 where the server validates a response received from the device. In some embodiments, the server verifies an authentication token received from the device. For example, the server can be configured to determine whether the recovered nonce N1' matches with the nonce N1 generated by the server. In some embodiments, the server can be configured to continue the re-enrollment process 400 responsive to determining a successful response to the first challenge set. For example, the re-enrollment continues if recovered nonce N1' matches nonce N1. The server can be configured to end the re-enrollment process 400 if the server determines that the response from the device is not valid.

If the device is successfully authenticated (e.g., if N1'=N1) at step 412, process 400 proceeds to act 414 where the server generates new challenge values corresponding to new sets of enrollment values. In some embodiments, the server generates new challenges and sends them to the device. For example, the server can be configured to generate new challenges C3 and C4 and send them to the device. In some embodiments, the device can be configured to generate the new challenges C3 and C4.

Next, process 400 proceeds to act 416 where the device generates a response for each of the received challenges C3 and C4. In some embodiments, the device employs the PUF to generate an output for each challenge. In some embodiments, the device communicates each challenge to the PUF as input and receives a corresponding output. For example, the PUF can be configured to generate outputs R3 and R4 corresponding to the challenges C3 and C4 respectively.

Next, process 400 proceeds to act 418 where the device generates one or more new keys or secrets. In some embodiments, the device can be configured to generate keys or secrets as a values that are to be recovered using the PUF and that remain constant for a constant input (e.g., for a given challenge). For example, the device can generate keys or secrets V3 and V4 respectively mapped to responses R3 and R4 generated by the PUF. Each of V3 and V4 can, for example, be generated as described in Algorithm 1 above. In some embodiments, the device can generate each of V3 and V4 as a random value such as a random string of bits, a random number, or other type of random value as a key or secret. In some embodiments, the server can be configured to generate keys or secrets or shares as values that are to be recovered using the device's PUF. For example, the server can generate keys or secrets or shares V3 and V4 to be respectively mapped to responses R3 and R4, and can be configured to communicate V3 and V4 securely to the device (e.g., using a shared symmetric encryption key, or a secure channel established with the device).

Next process 400 proceeds to act 420 where the device generates helper values. In some embodiments, the device generates helper values for each key or secret V3 and V4. For example, the device can generate helper values H3 and H4 for key or secrets V3 and V4. Each helper value can, for example, be generated by executing Algorithm 1 described above. For example, each helper value can be generated by: (1) executing ECC on a generated key or secret, and (2) executing an "exclusive or" operation between the result of the ECC on the key or secret and a PUF response to generate a helper value corresponding to the PUF response. In the example where the device receives two challenges (C3, C4), generates two PUF responses (R3, R4), and generates two keys or secrets (V3, V4), the device can generate two helper values (H3, H4) where each helper Hi=ECC(Vi) xor Ri.

Next process 400 proceeds to act 422 where the device generates sets of enrollment values and sends them to the server. In some embodiments, the device forms a set of enrollment values as a challenge, helper value, and associated key or secret. In some embodiments, the device can be configured to encrypt the newly generated key or secrets (e.g., V3 and V4) using a key or secret. In some embodiments, the key or secret can comprise a symmetric key that both the device and server can access. In some embodiments, the key or secret may be associated with the first set of original enrollment values from the original commitment. For example, the device can be configured to use key or secret V1 that was recovered in act 406 to encrypt the newly generated keys or secrets V3 and V4. The device can then send the secured new sets of enrollment values to the server. For example, for received challenges C3 and C4, the device can generate and send new sets of enrollment values {C3, H3, E_V1(V3)} and {C4, H4, E_V1(V4)} where E_V1(V3) and E_V1(V4) are encryptions of key or secrets V3 and V4 generated using original key or secret V1.

Next, process 400 proceeds to act 424 where the server receives the new sets of enrollment values. In some embodiments, the server can be configured to decrypt the new keys or secrets using an original key or secret (e.g., V1). For example, the server can decrypt E_V1(V3) and E_V1(V4) using the original key or secret V1. In some embodiments, the server stores the new sets of enrollment values {C3, H3, V3} and {C4, H4, V4}.

Next, process 400 proceeds to act 426 to validate the newly received sets of enrollment values. In some embodiments, the server generates a second challenge set using a second set of original enrollment values. For example, the server may generate a second challenge set {C2, H2, E_V2 (N2} using original enrollment set {C2, H2, V2} where E_V2(N2) is an encryption of a randomly generated nonce N2 encrypted using key or secret V2. The server sends the second challenge set to the device.

Next, process 400 proceeds to act 428 where the device uses the PUF to generate a response using the second challenge set. For example, the device can communicate the challenge C2 to the PUF. The PUF can generate a response R2. In some embodiments, the PUF can generate a response based on the challenge C2 in addition to the unique hardware properties of the PUF.

Next process 400 proceeds to act 430, where the device recovers a key or secret using the output generated by the PUF. In some embodiments, the device can employ a received helper value H2 and decoding code to recover the value (e.g., as described by Algorithm 2 above). In process 300, the device recovers a key or secret V2 by decoding a result of an "exclusive or" operation between the output (R2) of the PUF and the received helper value (H2).

Next, process 400 proceeds to act 432 where the device generates a value to be used by the server for validation of the device. In some embodiments, the device can use the recovered value V2 to execute a cryptographic operation. For example, the device can use the recovered key or secret V2 to decrypt the received encryption E_V2(N2) in the second challenge set to recover a value N2'. Next, at act 434, the device sends a result of the cryptographic operation to the server. For example, in process 400, the device sends recovered nonce N2' to the server. In some embodiments, the device can be configured to generate an authentication token and include the recovered nonce N2' in the authentication token.

Next, process 400 proceeds to act 436 where the server validates a response received from the device. In some embodiments, the server verifies an authentication token received from the device. For example, the server can be configured to determine whether the recovered nonce N2' matches with the nonce N2 generated by the server. If the server determines that the response from the device is valid (e.g., if N2'=N2), the server can accept the new sets of enrollment values (e.g., {C3, H3, V3} and {C4, H4, V4}). Accordingly, the device and server can utilize the new sets of enrollment values in subsequent authentication (e.g., in process 300). If, however, the server determines that the response from the device is not valid (e.g., N2' does not match N2), the server can determine that the device and/or PUF has been tampered with. In this case, the server can be configured to reject the new received sets of enrollment values. Additionally, the server can further store information or generate an alert indicating that the device has potentially been tampered with.

In some embodiments, sets of enrollment values can be associated with shares of an actual key or secret. The device can complete authentication by successfully recovering a threshold number of shares of the key or secret. In these embodiments, the verifier 120 and/or device can be configured to store sets of enrollment values as challenge helper pairs associated with each share and a key or secret that can be generated by combining the shares. For example, the verifier can store a first set of enrollment values {C1, H1} associated with a first share V1 and a second set of enrollment values {C2, H2} associated with a second share V2 and a key or secret V that can be recovered using the shares V1 and V2.

In some embodiments, Shamir's secret sharing scheme may be used to split a key or secret such that the key or secret can be recovered through polynomial interpolation using individual shares of the key or secret. For example, in a two share system, both values are needed in order to recover the key or secret. For a key or secret V, the verifier 120 can be configured to store a set of enrollment values as {{C1, H1}, {C2, H2}, V}. In this example, the shares recovered using {C1, H1} and {C2, H2} during authentication can be used to retrieve the key or secret V by polynomial interpolation of the shares. The verifier 120 can then determine whether the recovered value matches the stored key or secret. In some embodiments, the verifier can be configured to only store a result of a function executed using the key or secret (e.g., f(V)). In this embodiment, the verifier can be configured to recover the key or secret using the recovered shares received from the device and calculate the one way function of the recovered key or secret. If the result of the one way function matches the stored one way function result, the device can be authenticated.

Figure 5:
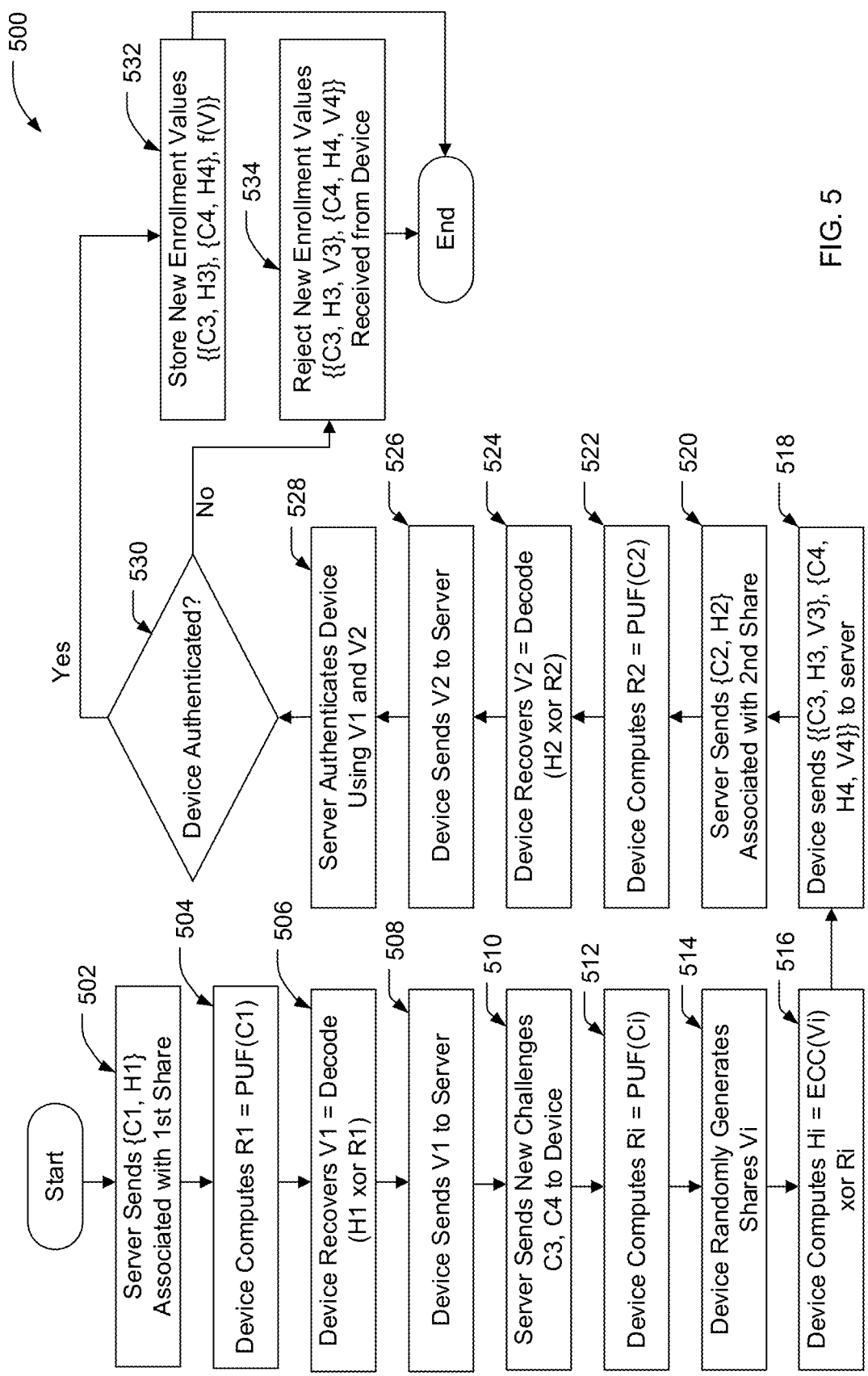
FIG. 5 illustrates an example process flow for re-enrolling multiple shares of a commitment of a PUF device, according to some embodiments.

According to some embodiments in which a verifier 120 is configured to store sets of enrollment values corresponding to shares of a key or secret or secret, the sets of enrollment values can be used to execute secure, remote re-enrollment. FIG. 5 illustrates a process 500 according to which a device (e.g., device 110) with a PUF (e.g., PUF 112) can execute a re-enrollment command with a server (e.g., verifier 120) using sets of enrollment values associated with shares of a key or secret. In some embodiments, the device can be configured to execute the re-enrollment command responsive to a command from the server. Additionally or alternatively, the device 110 can be configured to execute re-enrollment at a regular frequency (e.g., every month).

Process 500 begins at act 502 where the server generates and sends a first challenge set associated with a first set of enrollment values to the device. In some embodiments, the first set of enrollment values can correspond to a first share of an original key or secret. For example, in process 500 the server sends a challenge, helper pair {C1, H1} to the device. The challenge and helper may have been generated and stored during an enrollment process.

Next, process 500 proceeds to act 504 where the device uses the PUF to compute a response value using the first challenge set. For example, the device can communicate the challenge C1 to the PUF. The PUF can generate a response R1. In some embodiments, the PUF can be configured to generate a response based on the challenge C1 in addition to the unique hardware properties of the PUF.

Next process 500 proceeds to act 506, where the device recovers a first share of a key or secret using the output generated by the PUF. In some embodiments, the device can employ the received helper value H1 and decoding code to recover the first share (e.g., as described by Algorithm 2 above). In process 500, the device recovers the first share V1 by decoding a result of an "exclusive or" operation between the output R1 of the PUF and the received helper value H1.

Next, process 500 proceeds to act 508 where the device sends the recovered first share V1 of the key or secret to the server. In some embodiments, the server can store the first share V1. Next, process 500 proceeds to act 510 where the server generates new challenges corresponding to new sets of enrollment values and sends them to the device. For example, the server generates and sends two new challenges C3 and C4. In some embodiments, the device can be configured to generate the two new challenges C3 and C4.

Next, process 500 proceeds to act 512 where the device generates a response for each of the challenges C3 and C4. In some embodiments, the device employs the PUF to generate an output for each challenge. In some embodiments, the device communicates each challenge to the PUF as input and receives a corresponding output. For example, the PUF can be configured to generate outputs R3 and R4 corresponding to the challenges C3 and C4 respectively.

Next, process 500 proceeds to act 514 where the device generates new shares of a new key or secret. In some embodiments, the device can be configured to generate each share as a value that is to be recovered using PUF and that remains constant for a constant input (e.g., for a given challenge). For example, the device can generate commitment shares V3 and V4 corresponding to responses R3 and R4 generated by the PUF. Each of the commitment shares V3 and V4 can, for example, be generated as described in Algorithm 1 above. In some embodiments, the commitment share can comprise a random value such as a random string of bits, a random number, or other type of random value.

Next process 500 proceeds to act 516 where the device generates helper values associated with each generated share of the new key or secret. In some embodiments, the device generates helper values for each share. For example, the device can generate helper values H3 and H4 for shares V3 and V4. Each helper value can, for example, be generated by executing Algorithm 1 described above. For example, each helper value can be generated by: (1) executing ECC on a generated share, and (2) executing an "exclusive or" operation between the result of the ECC on the share and a PUF response to generate a helper value corresponding to the PUF response. In the example where the device receives two challenges (C3, C4), generates two PUF responses (R3, R4), and generates two shares (V3, V4), the device generates two helper values (H3, H4) where each helper as Hi=ECC(Vi) xor Ri.

Next, process 500 proceeds to act 518 where the device generates one or more new sets of enrollment values and sends them to the server. In some embodiments, the device can be configured to combine the generated shares into a key or secret. For example, the device can be configured to generate a new key or secret V using generated shares V3 and V4. The device can send the generated sets of enrollment values {{C3, H3}, {C4, H4}, V} to the server. In some embodiments, the device sends the generated shares to the server and the server can be configured to generate the key or secret V using the newly received shares. For example, the device can send {C3, H3, V3} and {C4, H4, V4} to the server. The server can compute the new key or secret V using the shares V3 and V4 and store the key or secret V or a value of a function of the key or secret f(V).

Next, process 500 begins at act 520 where the server generates and sends a second challenge set using a second set of enrollment values to the device. In some embodiments, the second set of enrollment values can correspond to a second share of an original key or secret. For example, in process 500 the server sends a challenge, helper pair {C2, H2} to the device. The challenge and helper may have been generated and stored during an enrollment process.

Next, process 500 proceeds to act 522 where the device uses the PUF to compute a response value using the second challenge set. For example, the device can communicate the challenge (C2) to the PUF. The PUF can generate a response (R2). In some embodiments, the PUF can be configured to generate a response based on the challenge (C2) in addition to the unique hardware properties of the PUF.

Next, process 500 proceeds to act 524, where the device recovers a second share of a key or secret using the output generated by the PUF. In some embodiments, the device can employ the received helper value H2 and decoding code to recover the second share (e.g., as described by Algorithm 2 above). In process 500, the device recovers the second share V2 by decoding a result of an "exclusive or" operation between the output R2 of the PUF and the received helper value H2.

Next, process 500 proceeds to act 526 where the device sends the recovered second share of the key or secret to be used by the server for validation of the device and/or validation of new sets of enrollment values. At act 528, the server authenticates the device using the received first and second shares V1 and V2. In some embodiments, the server can be configured to recover the key or secret. For example, the server can execute polynomial interpolation using recovered shares V1 and V2 to generate recovered key or secret V'. In some embodiments, the server can be configured to compare the recovered key or secret V' to a stored key or secret V. Additionally or alternatively, the server can be configured to compute a function using individual shares V1 and V2 and compare it to a stored result of a function executed on the original key or secret.

In one embodiment, a function f(.) can represent a scalar multiplication of a public base point G on an elliptic curve. A function executed on an original key or secret f(V)=VG can represent a committed key or secret of the device. When the server receives recovered share V1, the server can calculate f(V1). When the server receives share V2, it can computer f(V1)*V2 and compare the result to VG. The Applicant has appreciated that computing f(V1) and storing the result and then multiplying by the share V2 prevents both shares from being in memory simultaneously in a memory of the server. Further, this prevents regeneration of V itself. In another embodiment, the server can calculate f(V1*V2) and compare the result to VG to authenticate the device.

In some embodiments, a function f(.) can represent a cryptographic hash function. The server, to authenticate, can perform f(V1*V2) and determine if the result equals f(V) stored in the server during enrollment. In some embodiments, the server can first collect V1 from the device and store it, as authentication cannot complete without V2. The one or more new sets of enrollment values are collected (e.g., at act 518) from the device but not yet accepted by the server. After collecting V2, the server can determine if f(V1*V2)=f(V).

Next, process 500 proceeds to act 530 where the server determines whether the device was authenticated successfully. If the device is authenticated successfully 530, YES, process 500 proceeds to act 532 where the server stores the newly received sets of enrollment values. For example, the server can be configured to store {C3, H3}, {C4, H4} and the new key or secret (V) and/or a function of the new key or secret f(V). In some embodiments, the server can be configured to compute the new key or secret (V) from received shared V3 and V4 responsive to successful authentication. The device and server can subsequently use the new sets of enrollment values for authentication If the device was not authenticated successfully using the original sets of enrollment values 530, NO, process 500 proceeds to act 534 where the server rejects the new sets of enrollment values. In some embodiments, the server can be configured to detect that the device and/or PUF have been tampered with responsive to detecting that the authentication failed. The server can, in response, block access of the device. Additionally or alternatively, the server can be configured to generate an alert or store information indicating that the device has potentially been breached.

Threshold Cryptography

Some embodiments of the present invention can be configured to incorporate threshold cryptography systems and techniques described in U.S. U.S. Publication No. 2017/0063559 entitled "AUTHENTICATION SYSTEM AND DEVICE INCLUDING PHYSICAL UNCLONABLE FUNCTION AND THRESHOLD CRYPTOGRAPHY," incorporated herein by reference.

According to some embodiments, threshold cryptography involves distributing cryptographic operations among a set of participants such that operations are only possible with the collaboration of a quorum of participants. In some embodiments, a trusted dealer generates a master private key or secret for a set of participants. The private key or secret is then split among the participants with each participant receiving a share of the private key or secret. A quorum of participants must combine their private shares to perform an operation using the master private key or secret.

According to some embodiments, PUF based techniques are adapted to secret or private key or secret sharing to permit threshold cryptography for use with a PUF device (e.g., device 110 with PUF 112). In one example employing elliptic curve cryptography, distributed key or secret generation is used to generate a number of shares (for example two: $r_1$, $r_2$) of a master private key or secret $P^{priv}=(r_1+r_2) \bmod q$. In some embodiments, the private key or secret itself is never generated or constructed.

Figure 6:
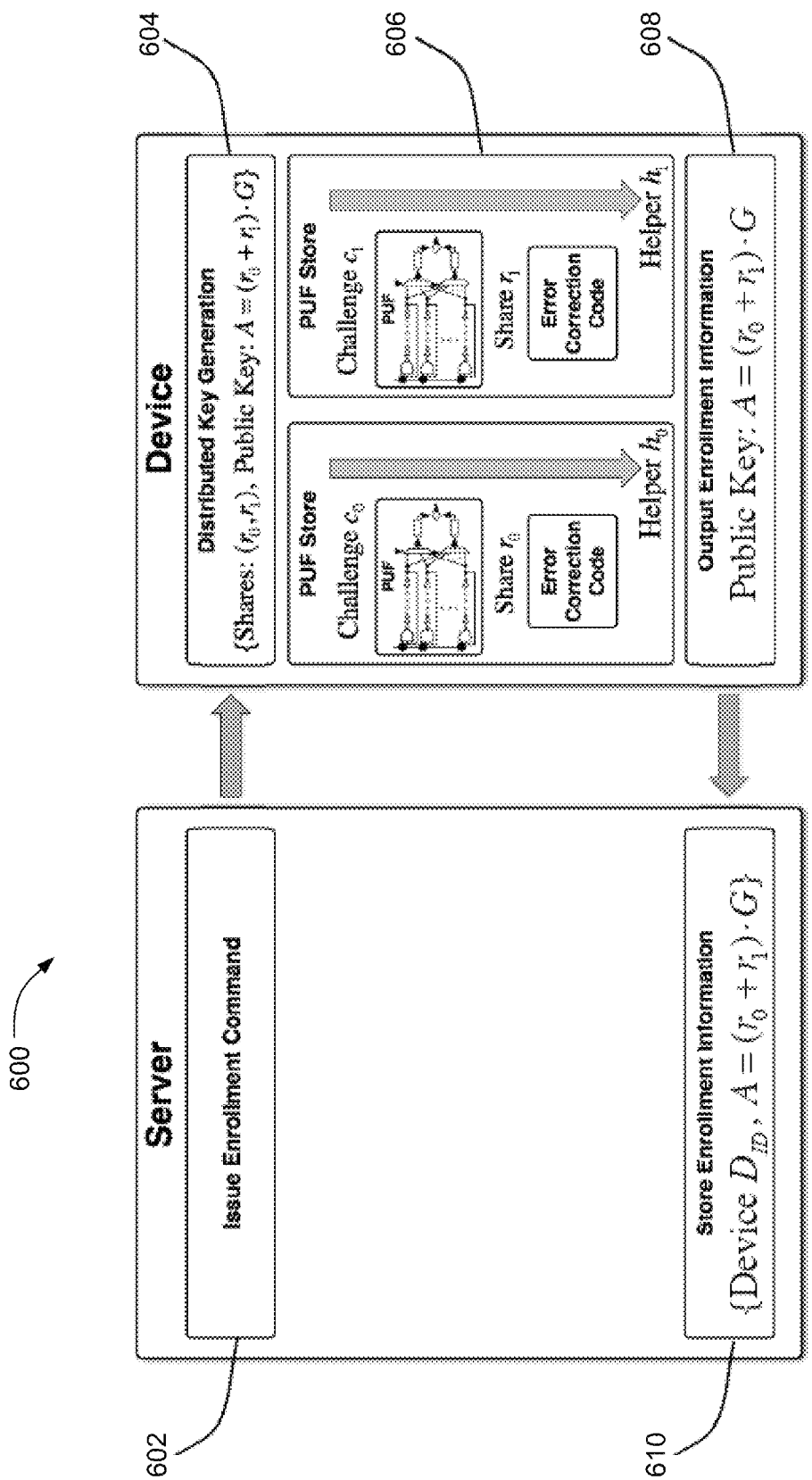
FIG. 6 is a system process flow diagram for enrolling a PUF device for threshold cryptographic authentication, according to some embodiments.

FIG. 6 illustrates an example system process flow 600 for generating shares of a key or secret according to some embodiments. The process illustrated in FIG. 6 can be executed by a server (e.g., verifier 120) and a device (e.g., device 110).

The example process flow 600 begins at act 602 where the server issues an enrollment command. In one example, the server and device agree on an elliptic curve E defined over a finite field $F_p$ and base point G of order q, where p is λ bits long.

Next, process flow 600 proceeds to act 604 where the device performs a distributed key or secret generation process locally. For example, the device creates shares ($r_0$, $r_1$) of a master private key or secret (which is never generated or constructed) and its public key or secret A=($r_0$+$r_1$)*G. In some embodiments, rather than directly adding the shares together (which would construct the private key or secret), the public key or secret is formed by computing ($r_0$*G)+ ($r_1$*G).

Algorithm 3 below illustrates example technique by which the device performs distributed key or secret generation. In Algorithm 3, the device can, for example, choose (t, n) as (2, 2) in order to generate two shares of the master private key or secret.

---

Algorithm 3

Goal: Generate shares of master private key $\mathcal{P}^{priv}$
for $1 \leq i \leq n$ do
    Select random polynomial $f_i(\cdot) = c_0^{(i)} + \ldots + c_{t-1}^{(i)} x^{t-1} \bmod q$
    Compute $f_i(j), \forall j \in [1, \ldots, n]/i$
    Store coefficient commitments $\{c_k^{(i)} \cdot G \bmod p\}_{k \in [0, \ldots, t-1]}$
    Store share commitments $\{f_i(j) \cdot G \bmod p\}_{j \in [0, \ldots, n]}$
    for $1 \leq i \leq n$ do
        Verify $$f_i(j) \cdot G \stackrel{?}{=} \sum_{k=0}^{t-1} j^k (c_k^{(i)} \cdot G) \bmod p$$

Verify $$c_0^{(i)} \cdot G \stackrel{?}{=} \sum_{i=1}^{t} \left( \left( \prod_{\substack{j=1 \\ j \neq i}}^{t} \frac{-j}{i-j} \right) f_i(j) \cdot G \right) \bmod p$$

end for
Recover share $$r_i = \sum_{j=1}^{n} \left( \left( \prod_{\substack{j=1 \\ j \neq i}}^{t} \frac{-j}{i-j} \right) f_j(i) \right) \bmod q$$

Recover public key $$\mathcal{P}^{pub} = r \cdot G = \sum_{j=1}^{n} \sum_{i=1}^{n} \left( \left( \prod_{\substack{j=1 \\ j \neq i}}^{t} \frac{-j}{i-j} \right) f_j(i) \right) \cdot G \bmod p$$

end for

---

Next, process flow 600 proceeds to act 606 where the device generates random challenge c=$c_0$||$c_1$ and each challenge is $\lambda$ bits long. The device links each share $r_i$ to an output $O_i$ of the PUF on challenge $c_i$ and further generates a helper value $h_i$. The device can, for example, accomplish this by executing Algorithm 4 below. During authentication, challenges $c_0$ and $c_1$ and helper values $h_0$ and $h_1$ can be used to recover the shares. In some embodiments, the challenge and the helper data are public and reveal nothing about the shares or the private key or secret or secret.

---

Algorithm 4

Goal: Store value $\mathcal{V}_i$
for PUF Device d do
    Select finite field $\mathbb{F}_n$ of order n

---

Algorithm 4

Select E, an elliptic curve over $\mathbb{F}_n$
    Find $G \in E/\mathbb{F}_n$, a group generator
    Select challenge $c_i \in \mathbb{F}_n$
    $x = H(c_i, E, G, n)$
    $O = PUF(x)$
    $helper_i = P_i = O \oplus ECC(\mathcal{V}_i)$
    Write $\{c_i, helper_i\}$ to non-volatile memory
end for

---

Algorithm 4 illustrates storing of a sensitive value $V_i$ using a PUF. In some embodiments, the challenge $c_i$ and helper data $helper_i$ can be public as neither reveals anything about the sensitive value $V_i$.

Next, process flow 600 proceeds to act 608 where the device generates its public enrollment information. For example, the device generates a public key or secret A=($r_0$+$r_1$)*G. The device transmits the enrollment information to the server.

Next process flow 600 proceeds to act 610 where the server stores the device's public enrollment information. In some embodiments, the server can further store a device identifier that is unique to the device (e.g., a serial number).

Figure 7:
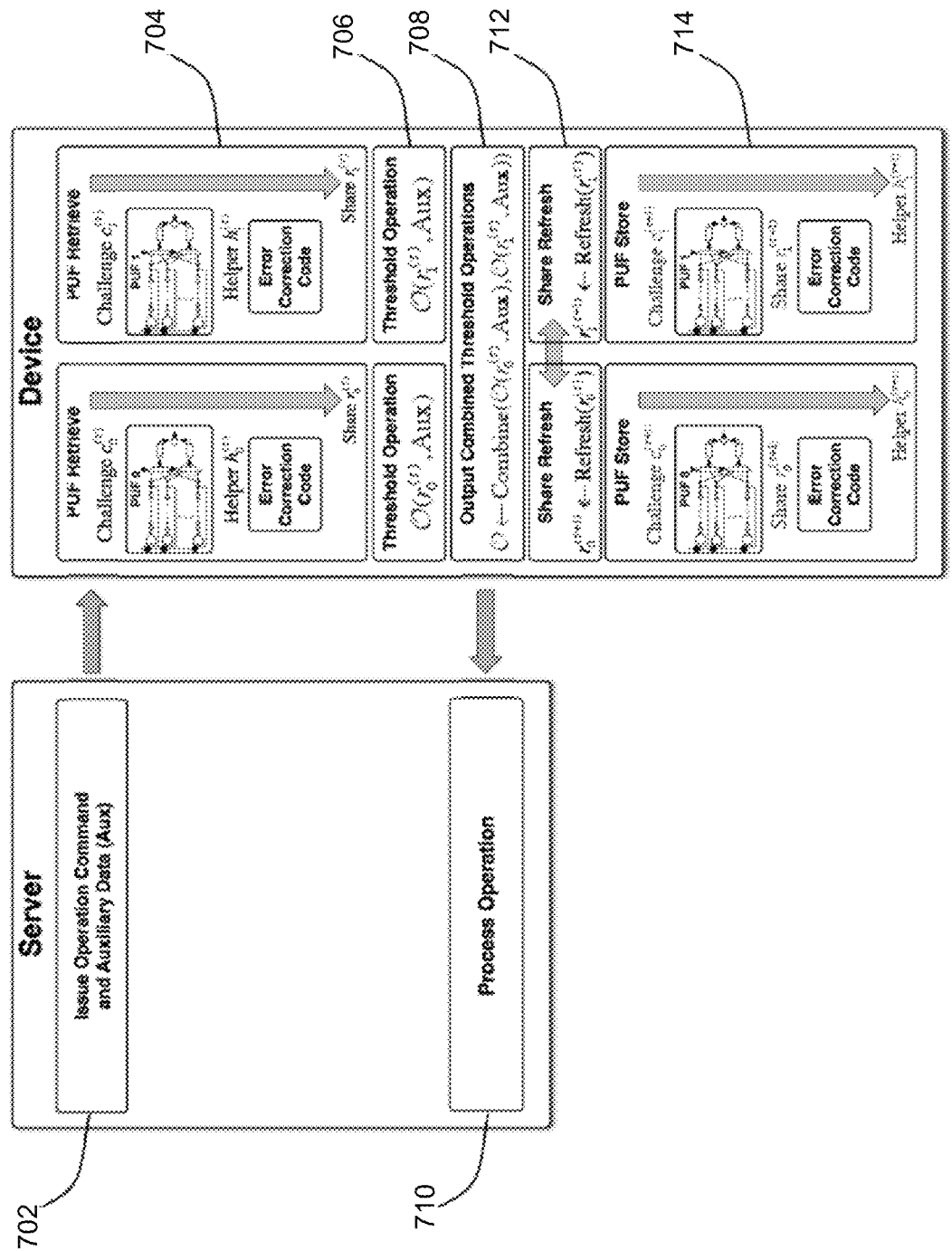
FIG. 7 is a system process flow diagram for authenticating a PUF device using threshold cryptographic authentication, according to some embodiments.

After initial share generation and device enrollment, the device and server can execute authentication. FIG. 7 illustrates an example system process flow 700 of authentication that can be executed by a server (e.g., verifier 120) and device (e.g., device 110). The authentication can, for example, be executed by the server and device that executed process 600 described above in reference to FIG. 6.

Process flow 700 begins at act 702 where, in some embodiments, the server can require the device to perform a cryptographic operation (e.g., decryption, digital signature generation, zero knowledge proof authentication). The server can be configured to issue a command. In some embodiments, the server can further be configured to issue any auxiliary data necessary to carry out the operation (e.g., ciphertext to be decrypted, a message to be signed).

Next, process 700 proceeds to act 704 where the device reads the challenge c=$c_0$||$c_1$ and helper data h=$h_0$||$h_1$ from its local storage. The device then queries the PUF (e.g., PUF 112) using each challenge $c_i$, and combines the output $O'_i$ with the helper $h_i$ and error correcting code to recover each share $r_i$. Algorithm 5 illustrates an example process by which the device recovers each share.

---

Algorithm 5

Goal: Retrieve value $\mathcal{V}_i$
for PUF Device d do
    Read $\{c_i, helper_i\}$ from non-volatile memory
    $x \leftarrow H(c_i, E, G, n)$
    $O' \leftarrow PUF(x)$
    $\mathcal{V}_i \leftarrow D((ECC(\mathcal{V}_i) \oplus O) \oplus O')$
end for

---

In Algorithm 5, the PUF device reads the challenge and helper values for each share stored during enrollment. The PUF device then utilizes the PUF to generate an output. The PUF output is then used with stored helper value (e.g., ECC($V_i$) exclusive-or O) to recover the value $V_i$.

Next, process 700 proceeds to act 706 where the device performed threshold operation over each share $r_i$. Next, at act 708 the device combines outputs of the threshold operations to form a complete operation. The device then sends a result of the complete operation to the server. Algorithm 6 below illustrates an example process that the device performs an operation by performing a threshold operation over each share and then combining the outputs of the threshold operations to complete the operation.

---
Algorithm 6
---

Goal: Perform threshold Operation $\mathcal{O}$
Assume: PUF-DKG (Algorithm 3) has been executed by PUF Device d for Server s do
    Issue Command $\mathcal{O}$ and Auxiliary Information Aux
end for
for PUF Device d do
    for each challenge $c_i$ (Challenge $c = c_0 || \ldots || c_n$) do
        Read challenge $c_i$ mid helper data $h_i$
        Recover share $r_i \leftarrow$ PUF-Retrieve($c_i, h_i$)
        Perform threshold operation $\mathcal{O}$ ($r_i$, Aux)
    end for
    Combine threshold operations $\mathcal{O} \leftarrow$ Combine($\{\mathcal{O}(r_i, \text{Aux})\}_{0 \leq i \leq n}$)
    return Result $\mathcal{O}$
end for
for Server s do
    Process operation $\mathcal{O}$
end for

---

Algorithm 6 above illustrates steps to evaluate an arbitrary operation that requires, as input, shares of the master private key or secret. The steps enable the operation to be executed by the PUF device without ever generating, reconstructing, or storing the private key or secret. Further, from the server's perspective, the PUF device implements standard symmetric or asymmetric cryptographic protocols. That is, the server never issues a challenge or stores helper data, and the server's interaction with the device is indistinguishable from that of any symmetric or asymmetric cryptography device.

Process 700 ends at act 710 where the server performs authenticating operations to verify the result. For example, the server can verify a zero knowledge proof.

In some embodiments, after authentication the device can proceed to acts 712 and 714 in which the device refreshes each share $r_i$. During a share refresh process the device can generate new shares and store associated challenge and helper values.

Specially Configured Computer System

Figure 8:
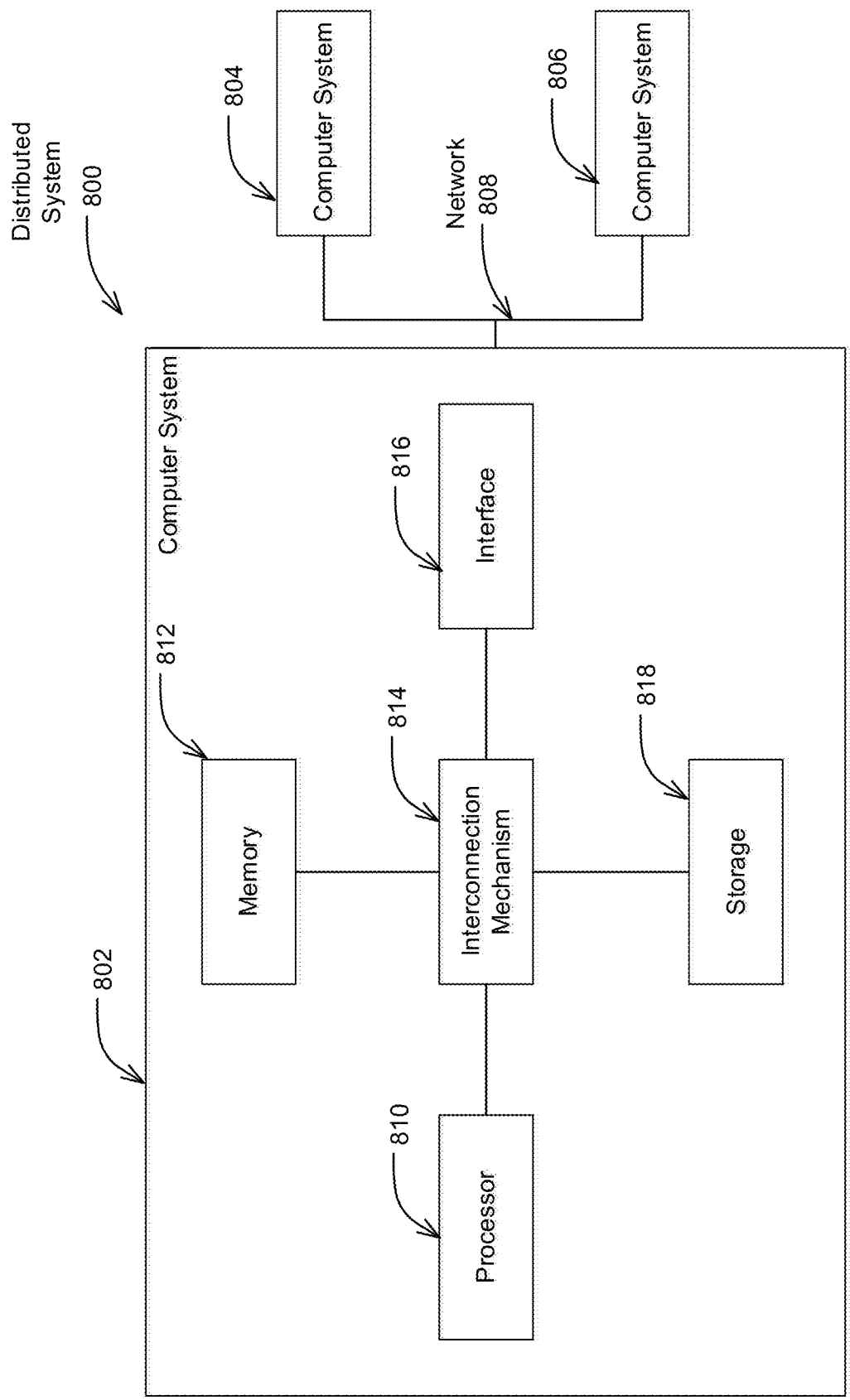
FIG. 8 is a schematic diagram of an computer system that may be specially configured to perform processes and functions disclosed herein, according to some embodiments.

For example, various aspects, functions, and processes may be distributed among one or more computer systems specially configured to provide a service to one or more client computers, or to perform an overall task as part of a distributed system, such as the distributed computer system 800 shown in FIG. 8. Additionally, aspects may be performed on a client-server or multi-tier system that includes components distributed among one or more server systems that perform various functions. Consequently, embodiments are not limited to executing on any particular system or group of systems. Further, aspects, functions, and processes may be implemented in software, hardware or firmware, or any combination thereof. Thus, aspects, functions, and processes may be implemented within methods, acts, systems, system elements and components using a variety of hardware and software configurations, and examples are not limited to any particular distributed architecture, network, or communication protocol.

Referring to FIG. 8, there is illustrated a block diagram of a distributed computer system 800, in which various aspects and functions are practiced. As shown, the distributed computer system 800 includes one or more computer systems that exchange information. More specifically, the distributed computer system 800 includes computer systems 802, 804, and 806. As shown, the computer systems 802, 804, and 806 are interconnected by, and may exchange data through, a communication network 808. The network 808 may include any communication network through which computer systems may exchange data. To exchange data using the network 808, the computer systems 802, 804, and 806 and the network 808 may use various methods, protocols and standards, including, among others, Fiber Channel, Token Ring, Ethernet, Wireless Ethernet, Bluetooth, IP, IPV6, TCP/IP, UDP, DTN, HTTP, FTP, SNMP, SMS, MMS, SS8, JSON, SOAP, CORBA, REST, and Web Services. To ensure data transfer is secure, the computer systems 802, 804, and 806 may transmit data via the network 808 using a variety of security measures including, for example, SSL or VPN technologies. While the distributed computer system 800 illustrates three networked computer systems, the distributed computer system 800 is not so limited and may include any number of computer systems and computing devices, networked using any medium and communication protocol.

As illustrated in FIG. 8, the computer system 802 includes a processor 810, a memory 812, an interconnection element 814, an interface 816 and data storage element 818. To implement at least some of the aspects, functions, and processes disclosed herein, the processor 810 performs a series of instructions that result in manipulated data. The processor 810 may be any type of processor, multiprocessor or controller. Example processors may include a commercially available processor such as an Intel Xeon, Itanium, Core, Celeron, or Pentium processor; an AMD Opteron processor; an Apple A4 or A5 processor; a Sun UltraSPARC processor; an IBM Power5+ processor; an IBM mainframe chip; or a quantum computer. The processor 810 is connected to other system components, including one or more memory devices 812, by the interconnection element 814.

The memory 812 stores programs (e.g., sequences of instructions coded to be executable by the processor 810) and data during operation of the computer system 802. Thus, the memory 812 may be a relatively high performance, volatile, random access memory such as a dynamic random access memory ("DRAM") or static memory ("SRAM"). However, the memory 812 may include any device for storing data, such as a disk drive or other nonvolatile storage device. Various examples may organize the memory 812 into particularized and, in some cases, unique structures to perform the functions disclosed herein. These data structures may be sized and organized to store values for particular data and types of data.

Components of the computer system 802 are coupled by an interconnection element such as the interconnection element 814. The interconnection element 814 may include any communication coupling between system components such as one or more physical busses in conformance with specialized or standard computing bus technologies such as IDE, SCSI, PCI and InfiniBand. The interconnection element 814 enables communications, including instructions and data, to be exchanged between system components of the computer system 802.

The computer system 802 also includes one or more interface devices 816 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 802 to exchange information and to communicate with external entities, such as users and other systems.

The data storage element 818 includes a computer readable and writeable nonvolatile, or non-transitory, data storage medium in which instructions are stored that define a program or other object that is executed by the processor 810. The data storage element 818 also may include information that is recorded, on or in, the medium, and that is processed by the processor 810 during execution of the program. More specifically, the information may be stored in one or more data structures specifically configured to conserve storage space or increase data exchange performance. The instructions may be persistently stored as encoded signals, and the instructions may cause the processor 810 to perform any of the functions described herein. The medium may, for example, be optical disk, magnetic disk or flash memory, among others. In operation, the processor 810 or some other controller causes data to be read from the nonvolatile recording medium into another memory, such as the memory 812, that allows for faster access to the information by the processor 810 than does the storage medium included in the data storage element 818. The memory may be located in the data storage element 818 or in the memory 812, however, the processor 810 manipulates the data within the memory, and then copies the data to the storage medium associated with the data storage element 818 after processing is completed. A variety of components may manage data movement between the storage medium and other memory elements and examples are not limited to particular data management components. Further, examples are not limited to a particular memory system or data storage system.

Although the computer system 802 is shown by way of example as one type of computer system upon which various aspects and functions may be practiced, aspects and functions are not limited to being implemented on the computer system 802 as shown in FIG. 8. Various aspects and functions may be practiced on one or more computers having a different architectures or components than that shown in FIG. 8. For instance, the computer system 802 may include specially programmed, special-purpose hardware, such as an application-specific integrated circuit ("ASIC") tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 802 may be a computer system including an operating system that manages at least a portion of the hardware elements included in the computer system 802. In some examples, a processor or controller, such as the processor 810, executes an operating system. Examples of a particular operating system that may be executed include a Windows-based operating system, such as, the Windows-based operating systems, available from the Microsoft Corporation, a MAC OS System X operating system or an iOS operating system available from Apple Computer, one of many Linux-based operating system distributions, for example, the Enterprise Linux operating system available from Red Hat Inc., or a UNIX operating system available from various sources. Many other operating systems may be used, and examples are not limited to any particular operating system.

The processor 810 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, Java, C++, C# (C-Sharp), Python, or JavaScript. Other object-oriented programming languages may also be used. Alternatively, functional, scripting, or logical programming languages may be used.

Additionally, various aspects and functions may be implemented in a non-programmed environment. For example, documents created in HTML, XML or other formats, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements (e.g., specialized hardware, executable code, data structures or objects) that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user space application) or in a commonly shared data structure (such as an application registry that is defined by an operating system). In addition, some examples provide for both system and user interfaces that allow external entities to modify the parameters and thereby configure the behavior of the components.

Based on the foregoing disclosure, it should be apparent to one of ordinary skill in the art that the embodiments disclosed herein are not limited to a particular computer system platform, processor, operating system, network, or communication protocol. Also, it should be apparent that the embodiments disclosed herein are not limited to a specific architecture or programming language.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having,", "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Use of at least one of and a list of elements (e.g., A, B, C) is intended to cover any one selection from A, B, C (e.g., A), any two selections from A, B, C (e.g., A and B), any three selections (e.g., A, B, C), etc., and any multiples of each selection.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An authentication device comprising:
   a physically unclonable function (PUF) device configured to generate an output value characteristic to the PUF device; and
   a processor connected to the PUF device, the processor configured to:
     generate a first set of initial enrollment values and a second set of initial enrollment values;
     execute a re-enrollment command on the PUF device, wherein the processor is further configured to:
       authenticate the PUF device using the first set of initial enrollment values;
       generate at least one new set of enrollment values using the PUF device; and
       determine whether the PUF device is in an unaltered state subsequent to generation of the at least one new set of enrollment values.

2. The authentication device of claim 1, wherein the processor is further configured to authenticate the PUF device with the second set of initial enrollment values to determine whether the PUF device is in the unaltered state.

3. The authentication device of claim 1, wherein the processor is configured to:
   issue a first challenge to the PUF device to generate a first output, the first challenge from the first set of initial enrollment values; and
   recover a first key or secret or a first share using the first output.

4. The authentication device of claim 1, wherein the processor is configured to communicate the at least one new set of enrollment values to a verifying device.

5. The authentication device of claim 1, wherein the processor is configured to reject the at least one new set of enrollment values responsive to a determination that the PUF device is not in an unaltered state subsequent to generation of the at least one new set of enrollment values.

6. The authentication device of claim 1, wherein the processor is configured to use the at least one new set of enrollment values for subsequent authentication responsive to a determination that the PUF device is in an unaltered state subsequent to generation of the at least one new set of enrollment values.

7. The authentication device of claim 1, wherein the processor is configured to:

communicate a challenge value to the PUF device to generate an output;
map the output to a new value, the new value representing new key or secret or a new share; and
include the challenge value and the new value in the at least one new set of enrollment values.

8. The authentication device of claim 7, wherein the processor is configured to:
   generate, using the output and the new value, a helper value; and
   include the helper value in the at least one new set of enrollment values.

9. The authentication device of claim 1, wherein the processor is configured to:
   recover a first key, the first key associated with the first set of initial enrollment values; and
   encrypt, using the recovered first key, at least a portion of the at least one new set of enrollment values.

10. The authentication device of claim 1, wherein generating the at least one new set of enrollment values comprises:
    generating at least one tuple including a challenge value, a helper value, and an encryption of a key or secret.

11. The authentication device of claim 1, wherein generating the at least one new set of enrollment values comprises generating a plurality of shares of a new key.

12. The authentication device of claim 1, wherein validating the at least one new set of enrollment values comprises:
    recovering a first share and a second share of a key, the first share and the second share respectively associated with the first and second sets of initial enrollment values; and
    authenticating the PUF device using the recovered first and second shares.

13. A computer-implemented method of authenticating a device, the method comprising:
    generating, by a processor, a first set of initial enrollment values and a second set of initial enrollment values, each of the first and second sets of initial enrollment values mapping a PUF output to a key or secret or share of a key or secret;
    executing a re-enrollment command on a PUF device, wherein the act of executing the re-enrollment command includes:
      authenticating the PUF device using the first set of initial enrollment values;
      generating at least one new set of enrollment values using the PUF device; and
      determining whether the PUF device is in an unaltered state subsequent to generation of the at least one new set of enrollment values.

14. The method according to claim 13, wherein the act of determining whether the PUF device is in an unaltered state subsequent to generation of the at least one new set of enrollment values includes:
    authenticating the PUF device with the second set of initial enrollment values.

15. The method according to claim 13, wherein the act of authenticating the PUF device using the first set of initial enrollment values includes:
    issuing a first challenge to the PUF device to generate a first output, the first challenge from the first set of initial enrollment values; and
    recovering a first key or secret or first share using the first output.

16. The method according to claim 13, further comprising communicating the at least one new set of enrollment values to a verifying device.

17. The method according to claim 13, further comprising:
rejecting the at least one new set of enrollment values responsive to determining that the PUF device is not in an unaltered state subsequent to generation of the at least one new set of enrollment values.

18. The method according to claim 13, further comprising using the at least one new set of enrollment values for subsequent authentication responsive to determining that the PUF device is in an unaltered state subsequent to generation of the at least one new set of enrollment values.

19. The method according to claim 13, wherein the act of generating the at least one new set of enrollment values comprises:
communicating a challenge value to the PUF device to generate an output;
mapping the output to a new value, the new value representing a new key or secret or a new share; and
including the challenge value and the new value in the at least one new set of enrollment values.

20. At least one non-transitory computer readable medium storing processor-executable instructions that, when executed, perform a method comprising:
generating a first set of initial enrollment values and a second set of initial enrollment values, each of the first and second sets of initial enrollment values mapping a PUF output to a key or secret or share of a key or secret;
executing a re-enrollment command on a PUF device, wherein the act of executing the re-enrollment command includes:
authenticating the PUF device using the first set of initial enrollment values;
generating at least one new set of enrollment values using the PUF device; and
determining whether the PUF device is in an unaltered state subsequent to generation of the at least one new set of enrollment values.

* * * * *